Jan. 23, 1968     L. W. FIDDES     3,364,764

BELT DRIVE TRANSMISSION

Filed Oct. 22, 1965

INVENTOR
Leslie William Fiddes

BY    MARTIN J. SPELLMAN, JR.

ATTORNEY

United States Patent Office 3,364,764
Patented Jan. 23, 1968

3,364,764
BELT DRIVE TRANSMISSION
Leslie William Fiddes, 29 Ronny Circle,
Hastings-on-Hudson, N.Y. 10706
Filed Oct. 22, 1965, Ser. No. 500,896
4 Claims. (Cl. 74—221)

ABSTRACT OF THE DISCLOSURE

A plurality of rotary work members are driven by frictional engagement with an endless belt. Each work member is associated with an individual control by which the belt may be moved from a free-running position selectively into a position in which it is held forcibly in driving engagement against the work member or into a position in which it is held forcibly away from and out of engagement with the work member.

---

The present invention relates generally to endless belt drive power transmissions, and in particular to such transmissions in which a plurality of rotary driven members are adapted to be driven from a single endless belt. Some examples of the general types of mechanisms with which this invention is concerned are illustrated in U.S. Patents 1,678,735 to Larson and 1,509,276 to Warfel. In the Larson type a selected one of a plurality of rotary members is moved bodily into frictional contact against a free running driving belt for operation; and in the Warfel type the driving belt is continuously in frictional driving contact with a plurality of free running rotary members that are associated with individual manually operative clutch means by which a selected one of the belt driven rotary members is placed in operating connection with work means driven thereby.

In drive mechanisms of the type above described, and in all transmissions in which the operation of work members is controlled by separate clutch means for connecting individual driven work members with a driving endless belt, the structures include somewhat complex assemblies involving numerous parts that present vexatious problems in installation, cleaning, and maintenance, and particularly so in the field of endless belt drive agitator apparatus such as vertical stirrers, mixers, and the like.

An object of this invention is to provide a simple endless belt drive mechanism having parts easily accessible during operation without dismantling the apparatus in which they are used, and which operates in a manner unknown to the art prior to the advent of this invention.

Another object is to provide a novel endless belt drive mechanism in which a plurality of rotary work members are adapted to be driven from a free running belt through frictional contact therewith, which contact is effected by selective control means that moves the belt into driving engagement with a selected one of the work members.

Still another object is to provide an endless belt drive mechanism of the character above stated, in which all work members engaged by the belt are driven thereby to rotate in the same direction.

Other and incidental objects will be apparent from the following description in conjunction with the accompanying drawings in which.

Figure 1:
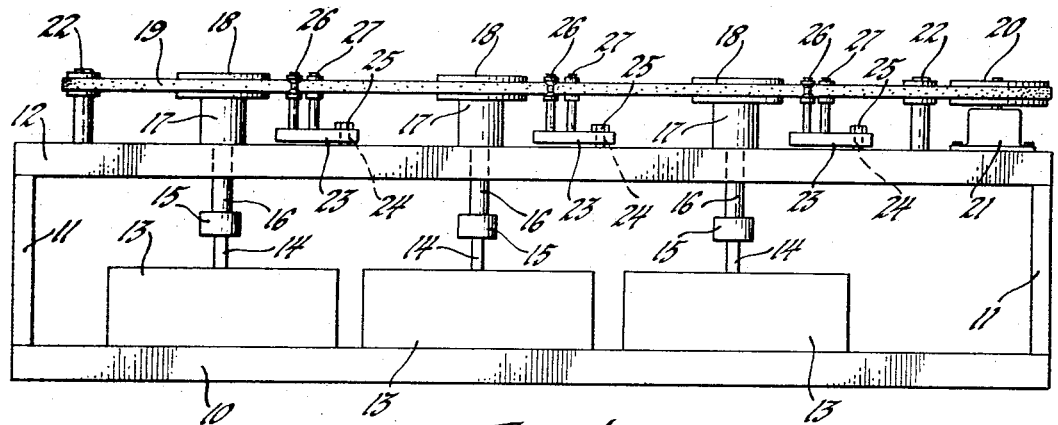
FIG. 1 is a front elevation of an apparatus embodying the invention.

For purposes of compliance with statute there is disclosed herein an illustrative, but not restrictive, embodiment of my invention. The particular apparatus here shown comprises generally a vertical frame having a horizontal base 10, which may be a table or bench top, vertical end posts 11, and a horizontal top shelf 12. The base 10 supports a plurality of open top receptacles 13 extending longitudinally along the base in side by side relation. Each is adapted to contain a batch of liquid or semiliquid material to be stirred or mixed by an agitator 14 of a type suited to the individual receptacle contents and disposed vertically through the open top of its associated receptacle. The upper end of each agitator 14 is detachably held in a chuck 15 on the lower end of a vertical spindle 16 that is freely rotatable in the top shelf 12 and which is integral with or fixedly attached at its upper end to the central hub 17 of a horizontal work pulley 18 above the shelf. Each pulley hub 17 is coaxial with its spindle 16 and is freely rotatable in a bearing socket (not shown) in the top face of the shelf.

Figure 2:
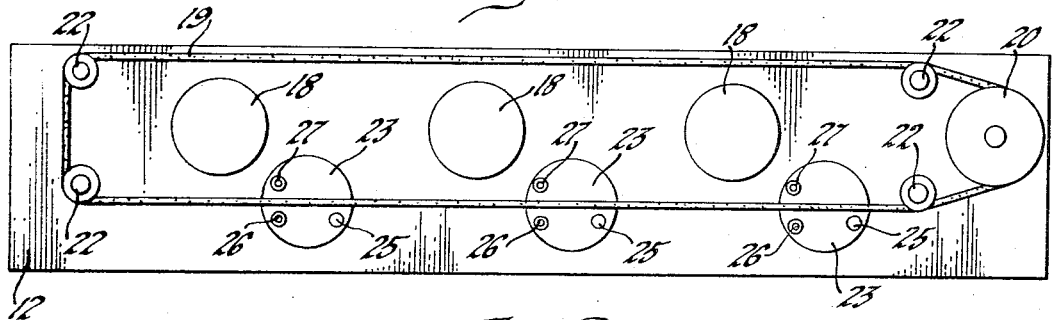
FIG. 2 is a top plan view thereof illustrating the drive in neutral position.

The work pulleys 18 are coplanar in a horizontal plane parallel to and above the shelf 12 at a distance determined by the axial extent of their hubs 17. The pulleys, here shown as three, are spaced apart longitudinally of the shelf in series and are adapted to be driven separately or in unison by peripheral frictional engagement with an endless belt 19 that is trained over a driving pulley 20 on the rotor of a motor 21 mounted on one end of the shelf 12. The belt is trained also over idler rollers 22 mounted on the shelf in an arrangement which, as shown in FIG. 2, maintains the rear flight of the belt free from engagement at any time with any of the work pulleys 18.

The endless belt 19 constitutes a power transmission between the driving motor 21 and the driven work pulleys 18. Each work pulley has associated therewith an individual manually operative control 23 which functions to shift the front flight of the belt selectively to any of three positions: in one of which the belt is out of engagement with any of the work pulleys and is idling, in another of which the belt is in driving engagement with the work pulley associated with that particular control, and in another of which the belt is forcibly restrained from any engagement with the work pulley associated with that particular control.

In the particular embodiment of the invention as herein disclosed each control 23 is a flat disc mounted on the shelf 12 for oscillation in a horizontal plane on and over the upper face thereof adjacent its associated work pulley. The disc is attached to the shelf by means of an eccentric pivot bolt 24. The stem of the bolt extends loosely through a complemental bore in the body of the control disc with its lower end threaded in a mounting socket in the body of the shelf. A head 25 on the upper end of the bolt shank bears against the top face of the control disc and, when the bolt is tightened, the head clamps the disc against the shelf, thereby anchoring the disc in a selected position of adjustment.

Each control disc 23 mounts a pair of vertical axis idler rollers consisting of a front roller 26 and a back roller 27. These are positioned identically on each disc and are spaced apart circumferentially in its peripheral margin zone so as to provide slight but ample clearance for the belt 19 which passes therebetween and out of contact with either when the drive is in neutral, as shown in FIG. 2. The idlers 26 and 27 are disposed in such relation that they are at the ends of an arc that is substantially diametrically opposed to their mounting disc pivot 24–25.

It is within the purview of the invention, and intended, that the pivot bolt 24 of each control disc 23 may be located on the axis of the disc instead of eccentric thereto as shown; in which case the disc would be rotatable rather than oscillatable. There are many possible variants of the control means structure, but the basic principle is the same for all: the control includes a body portion that is pivoted on the support shelf 12 for angular movement thereon relative to the proximate portion of the drive belt which it governs.

Operation

Normally, when the apparatus is not in operation, the drive is in neutral as shown in FIG. 2. In this condition the controls 23 are so disposed that the belt 19 is entirely out of contact with the idlers 26 and 27 of the control discs and also the work pulleys 18. When the motor 21 is put in operation it acts through its rotor shaft pulley 20 to drive the belt 19 which then runs free. Any selected one of the agitators 14 may then be set in operation by shifting the belt into frictional driving engagement with the peripheral face of the work pulley 18 to which the agitator spindle 16 is connected. This is accomplished by manual movement of its individual control disc 23 in a clockwise direction on its pivot bolt 24 sufficient to bring its front idler roller 26 into lateral pressure engagement against the belt and thereby carry the running belt bodily into frictional driving engagement against the work pulley. When satisfactory driving connection has been established between the belt and the work pulley the head 25 of the control pivot bolt 24 is manipulated to tighten the bolt home in its shelf socket and thus to clamp the control disc tightly down against the shelf and anchor the disc against dislodgment from its belt and pulley engaged position until the clamp is released sufficiently to allow the control disc to be moved counterclockwise to free the idler 26 from the belt.

Movement of any one of the controls 23 to carry the belt laterally into driving engagement with a selected work pulley 18 could also carrying the belt into engagement with adjacent work pulleys and thus set their agitators undesirably in operation. This contingency is avoided in the present invention by manipulating adjacent controls counterclockwise to positions such that their back idler rollers 27 carry the belt forcibly away from the work pulleys not to be driven, as shown by the intermediate control in FIG. 3, whereupon the control discs upon which they are mounted are anchored in belt disengaged position, thereby forcibly restraining the belt against movement toward engaged position.

Figure 3:
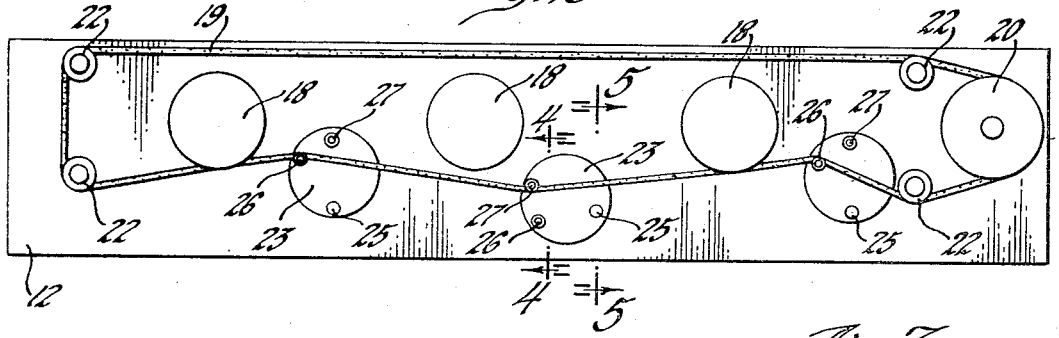
FIG. 3 is a view similar to FIG. 2 but showing the end work pulleys being driven while the intermediate pulley is disengaged.
Figures 4, 5:
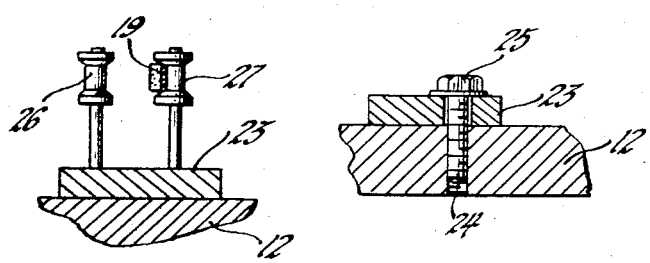
FIG. 4 is a fragmentary sectional view on line 4—4 of FIG. 3.
FIG. 5 is a fragmentary sectional view on line 5—5 of FIG. 3.

In like manner, when an agitator is to be cut out of the series either before or during operation, its control is anchored in the position of the intermediate control shown in FIG. 3.

Whereas the above detailed description has been directed to a specific structural embodiment of the present invention, it is pointed out that the invention is capable of practice by means of structure other than that here shown and is capable of expression in terminology broader in scope than that hereinbefore employed. In its broader aspects, the present invention is a mechanical power transmission in which any or all of a series of work members are driven selectively from a driving motor through the intermediary of an endless belt that is brought into or removed from driving connection with a selected work member by manually operable control means individual to each work member and which functions to move the belt bodily into and out of driving engagement with the work member. The control means includes a pair of parallel spaced belt guides, here shown as idler rollers but which could be round pins, studs or the like that receive the belt between them without contact when the control is in neutral position, and which engage the belt in response to directional movement of the control to move it and hold it in or out of driving engagement with its work member.

The means for anchoring the controls 23 in adjusted position need not be the specific pivot bolt structure here shown. It could be independent of the pivot and take any form appropriate to its function.

It is to be understood that the herein disclosed embodiment of my invention is illustrative of a practical example and that the invention is not restricted thereto. It may comprise any structure falling within the scope of the invention as claimed.

I claim:
1. A drive mechanism comprising in combination an endless belt having a driving flight and an idling flight; means for driving the belt; a series of rotary work members spaced apart along the same side of said driving flight to be driven thereby upon frictional engagement therewith; a control adjacent each work member and individual thereto; each control being movable selectively to various positions of adjustment in a first one of which positions no element of the control is in contact with any portion of the belt while it is running, in a second of which positions an element of the control forcibly holds the driving flight of the belt against and in driving engagement with the work member, and in a third of which positions an element of the control forcibly holds the driving flight of the belt away from and out of engagement with its work member.

2. In the drive mechanism of claim 1, said control including a support, an operating member pivotally mounted thereon for selective angular movement relative to its associated work member, a pair of belt guides fixed on the operating member in parallel spaced relation with the driving flight of the belt disposed between them and out of contact with either when the control is in said first position of adjustment, one of said guides contacting the belt and forcing it against the work member in driving engagement therewith when the control moves into said second position, and the other of said guides contacting the belt and forcing it away from and out of engagement with the work member when the control moves into said third position.

3. In the drive mechanism of claim 2, means for releasably anchoring said control in any of its said positions of adjustment.

4. In the drive mechanism of claim 2, said operating member being a disc, and said belt guides being disposed in circumferential spaced relation in the peripheral marginal zone thereof at the ends of an arc less than half the circumference of the disc.

References Cited

UNITED STATES PATENTS 2,791,910  5/1957  Eckley _____ 74—242.1
3,076,348  2/1963  Zober _____ 74—221

FRED C. MATTERN, Jr., *Primary Examiner.*

J. A. WONG, *Assistant Examiner.*